(12) United States Patent
Lahmann et al.

(10) Patent No.: US 12,248,313 B2
(45) Date of Patent: Mar. 11, 2025

(54) SYSTEM, METHOD AND APPARATUS FOR PROVIDING SPECIALIZED CONTROLLER TO REMOTELY PILOT AN UNMANNED VEHICLE

(71) Applicant: Valmont Industries, Inc., Omaha, NE (US)

(72) Inventors: Jacob Lahmann, Omaha, NE (US); Angi Chamberlain, Gretna, NE (US)

(73) Assignee: Valmont Industries, Inc., Omaha, NE (US)

( * ) Notice: Subject to any disclaimer, the term of this patent is extended or adjusted under 35 U.S.C. 154(b) by 325 days.

(21) Appl. No.: 17/851,573

(22) Filed: Jun. 28, 2022

(65) Prior Publication Data

US 2023/0012445 A1  Jan. 12, 2023

Related U.S. Application Data

(60) Provisional application No. 63/219,388, filed on Jul. 8, 2021.

(51) Int. Cl.
| | |
|---|---|
| *G05D 1/20* | (2024.01) |
| *B64C 39/02* | (2023.01) |
| *G05D 1/00* | (2006.01) |
| *G05D 1/221* | (2024.01) |
| *G05D 1/222* | (2024.01) |
| *G05D 1/224* | (2024.01) |

(Continued)

(52) U.S. Cl.
CPC ......... *G05D 1/0016* (2013.01); *B64C 39/024* (2013.01); *G05D 1/005* (2013.01); *G05D 1/101* (2013.01); *G05G 1/38* (2013.01); *G05G 1/44* (2013.01); *G05G 5/05* (2013.01); *B64U 2201/20* (2023.01); *G05G 2505/00* (2013.01)

(58) Field of Classification Search
CPC ...... G05D 1/0016; G05D 1/101; G05D 1/005; G05D 1/20; G05D 1/222; G05D 1/224; G05D 1/221; G05D 2109/20; G05G 2505/00; G05G 1/38; G05G 1/44; G05G 5/05; B64C 39/024; B64U 2201/20; B64U 2201/00
USPC ....................................................... 701/2, 3
See application file for complete search history.

(56) References Cited

U.S. PATENT DOCUMENTS 10,180,699 B1 * 1/2019 Love .................. G05G 11/00
12,029,938 B2 * 7/2024 Phillips .............. A63B 21/4035
(Continued)

OTHER PUBLICATIONS

Tech Briefs, Foot Pedal Controller, Published Feb. 1, 2019, Motion Design Magazine, pp. 1-5 (pdf).*
(Continued)

*Primary Examiner* — Manglesh M Patel
(74) *Attorney, Agent, or Firm* — Milligan PC LLO

(57) ABSTRACT

An apparatus for providing control signals to a remotely piloted unmanned aerial vehicle (UAV) which includes a pedal input mechanically connected to a base enclosure using a linkage system which allows for the angular movement of the pedal input. The apparatus further includes a potentiometer which provides a first control signal to a central controller indicating a detected angular position of the pedal. The central controller includes circuitry to translate the received first signal into a control signal which the central controller may transmit to one or more UAVs via a transceiver and antenna.

19 Claims, 3 Drawing Sheets

(51) Int. Cl.
*G05G 1/38* (2008.04)
*G05G 1/44* (2008.04)
*G05G 5/05* (2006.01)

(56) References Cited

U.S. PATENT DOCUMENTS

| | | |
|---|---|---|
| 2002/0022909 A1 | 2/2002 | Karem |
| 2003/0136875 A1 | 7/2003 | Pauchard |
| 2007/0072662 A1* | 3/2007 | Templeman ............ A63H 30/04 463/6 |
| 2007/0221782 A1 | 9/2007 | Cerchie et al. |
| 2009/0012657 A1 | 1/2009 | Knotts et al. |
| 2011/0271820 A1* | 11/2011 | Cockerell ............... G10H 1/348 84/746 |
| 2012/0056040 A1 | 3/2012 | Brotherton-Ratcliffe et al. |
| 2013/0298752 A1* | 11/2013 | Juszkiewicz ............ G10H 1/34 84/746 |
| 2015/0266125 A1* | 9/2015 | Enyedy ................... G05G 1/30 219/136 |
| 2015/0371622 A1* | 12/2015 | Beaty ...................... G10H 1/46 84/633 |
| 2016/0200437 A1 | 7/2016 | Ryan et al. |
| 2016/0286128 A1 | 9/2016 | Zhou |
| 2016/0325833 A1 | 11/2016 | Terasaka |
| 2017/0300051 A1 | 10/2017 | Zhou et al. |
| 2017/0341725 A1 | 11/2017 | Skahan |
| 2018/0280099 A1* | 10/2018 | Cone ....................... B25J 13/04 |
| 2019/0042003 A1 | 2/2019 | Parazynski et al. |
| 2019/0094854 A1 | 3/2019 | Seiler et al. |
| 2019/0219997 A1 | 7/2019 | Benda et al. |
| 2020/0233409 A1 | 7/2020 | Scaini |
| 2020/0257559 A1* | 8/2020 | Suvitie ................... G06F 9/4881 |
| 2020/0346736 A1 | 11/2020 | Krasnoff |

OTHER PUBLICATIONS

DJI, DJI Smart Controller Users Manual V1.0, published 2019, DJI, pp. 1-23.*

* cited by examiner

SYSTEM, METHOD AND APPARATUS FOR PROVIDING SPECIALIZED CONTROLLER TO REMOTELY PILOT AN UNMANNED VEHICLE

RELATED APPLICATIONS

The present application claims priority to U.S. Provisional Application No. 63/219,388 filed Jul. 8, 2021.

FIELD AND BACKGROUND OF THE PRESENT INVENTION

Field of the Present Invention

The present invention relates generally to a system for remotely controlling a vehicle. More specifically, the present invention provides a system, method and apparatus for providing foot pedal controls for controlling a remote piloted vehicle.

BACKGROUND OF THE INVENTION

Known prior art systems have included the use of Unmanned Aerial Vehicles (UAVs) to provide aerial data and to assist in field monitoring. For example, U.S. Published Application No. 2012/0290140A1 discloses a system which uses aerial data to make a set of moisture calculations for a given field.

A key issue in the use of such aerial data systems is that they require a single operator to provide three different steering inputs to control the UAV in three-dimensional space, along with thrust and braking inputs. Commonly, all of these inputs must be controlled and maintained by a single operator using two hands. For this reason, these control systems require qualified specialists to operate the remote-control systems.

Uses of foot-controlled inputs have been disclosed in the prior art. For example, U.S. Publication No. US2016325833A1 to Ryu discloses a remote-control system which includes an entire cockpit enclosure having a seat, a panel of controllers, and a pair of foot pedals which re-create the control pedals in an actual aircraft. U.S. Publication No. US2017341725A1 to Francis discloses a similar system.

Similarly, U.S. Publication No. US2020233409A1 to Carmelo discloses an apparatus for piloting a remote-controlled vehicle. The apparatus taught by Carmelo includes a frame system ridden by a user which includes hand and foot mechanical controllers coupled to the frame, and a transmitter for transmitting a control signal to a remote-controlled vehicle.

Each of these prior art systems are too cumbersome and expensive to be used in irrigation fields and similar environments. Additionally, these types of systems require the user to use four different extremities in a complex and coordinated fashion. Accordingly, what is needed is a system and apparatus which allows for the simplified control of UAVs and other remotely piloted vehicles. The present invention provides this and other advantages as discussed in further detail below.

SUMMARY OF THE PRESENT INVENTION

To address the shortcomings presented in the prior art, the present invention provides a system, method and apparatus for providing foot pedal inputs for controlling a remote piloted vehicle.

According to a preferred embodiment, an exemplary apparatus of the present invention may include a pedal input mechanically connected to a base enclosure using a linkage system which allows for the angular movement of the pedal input. The apparatus further includes a potentiometer which provides a first control signal to a central controller indicating a detected angular position of the pedal. The central controller includes circuitry to translate the received first signal into a control signal which is transmitted to one or more UAVs via a transceiver and antenna.

According to a further preferred embodiment, the present invention preferably further includes an indicator light which receives input from the controller to indicate a status of the apparatus such as system power ON/OFF, status of data exchange with the UAV, and/or a detected power level in the apparatus. According to a further preferred embodiment, the present invention preferably further includes a speaker which provides audio feedback regarding the operation of the apparatus.

The accompanying drawings, which are incorporated in and constitute part of the specification, illustrate various embodiments of the present invention and together with the description, serve to explain the principles of the present invention.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness. It should be understood that the scope of the present invention is intended to be limited solely by the appended claims.

DESCRIPTION OF THE PREFERRED EMBODIMENTS

Figure 1:
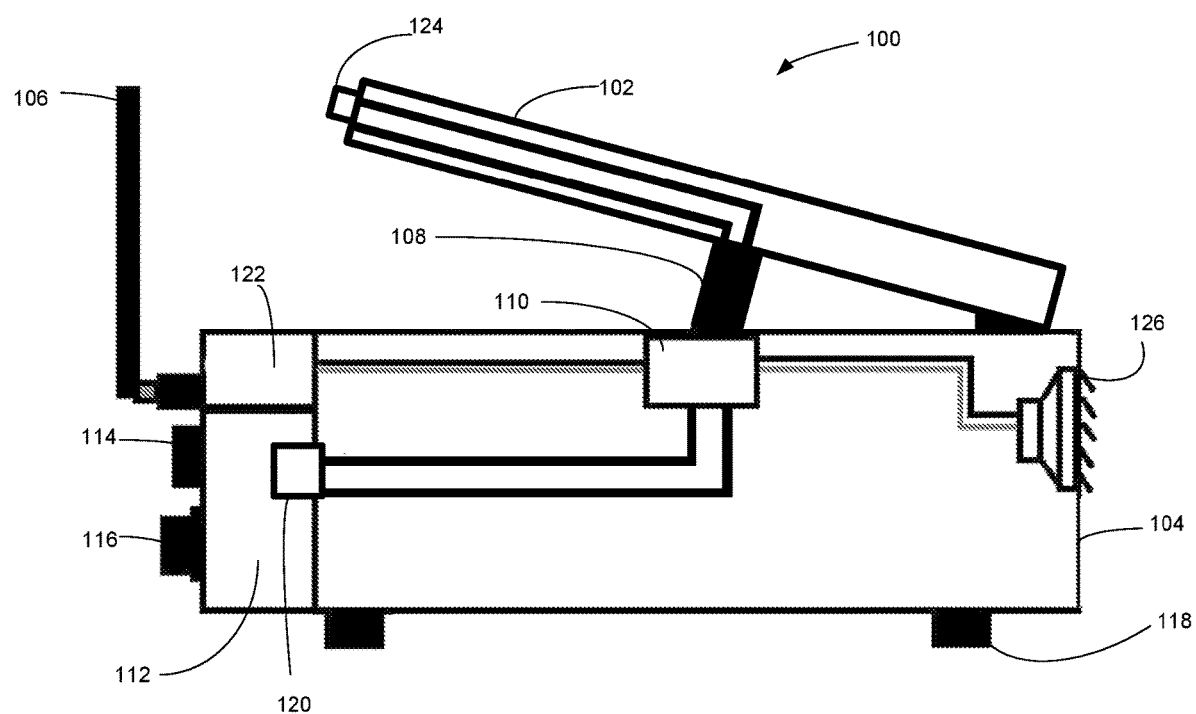
FIG. 1 shows a side cut-away view of an exemplary apparatus in accordance with a preferred embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art. The descriptions, embodiments and figures used are not to be taken as limiting the scope of the claims.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Moreover, the terms "embodiments of the invention", "embodiments" or "invention" do not require that all embodiments of the invention include the discussed feature, advantage or mode of operation, nor that it does not incorporate aspects of the prior art which are sub-optimal or disadvantageous.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Additionally, any examples or illustrations given herein are not to be regarded in any way as restrictions on, limits to, or express definitions of, any term or terms with which they are utilized. Instead, these examples or illustrations are to be regarded as illustrative only.

As used herein, the singular forms "a", "an" and "the" are intended to include the plural forms as well, unless the context clearly indicates otherwise. Additionally, the word "may" is used in a permissive sense (i.e., meaning "having the potential to"), rather than the mandatory sense (i.e. meaning "must"). Further, it should also be understood that throughout this disclosure, unless logically required to be otherwise, where a process or method is shown or described, the steps of the method may be performed in any order (i.e., repetitively, iteratively or simultaneously) and selected steps may be omitted. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The communication elements of the present invention as discussed below may include any of a number of signal processing elements including any mix of modulators, demodulators and/or receivers for a range of protocols including (but not limited to): Bluetooth, Bluetooth Low Energy ("BLE"), ZigBee, Thread, Wi-Fi (802.11xxx), 2G-5G, LTE, NFC, RFID, and DigiMesh protocols. Further, the communication elements may be wired, wireless, or combinations thereof. Communication and control systems of the present invention may also include signal or data transmitting and receiving circuits, such as antennas, amplifiers, filters, mixers, oscillators, digital signal processors (DSPs), and the like.

Further, many of the embodiments described herein are described in terms of sequences of actions to be performed by, for example, elements of a computing device. It should be recognized by those skilled in the art that the various sequences of actions described herein can be performed by specific circuits (e.g., application specific integrated circuits (ASICs)) and/or by program instructions executed by at least one processor to enable the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter.

Figure 2:
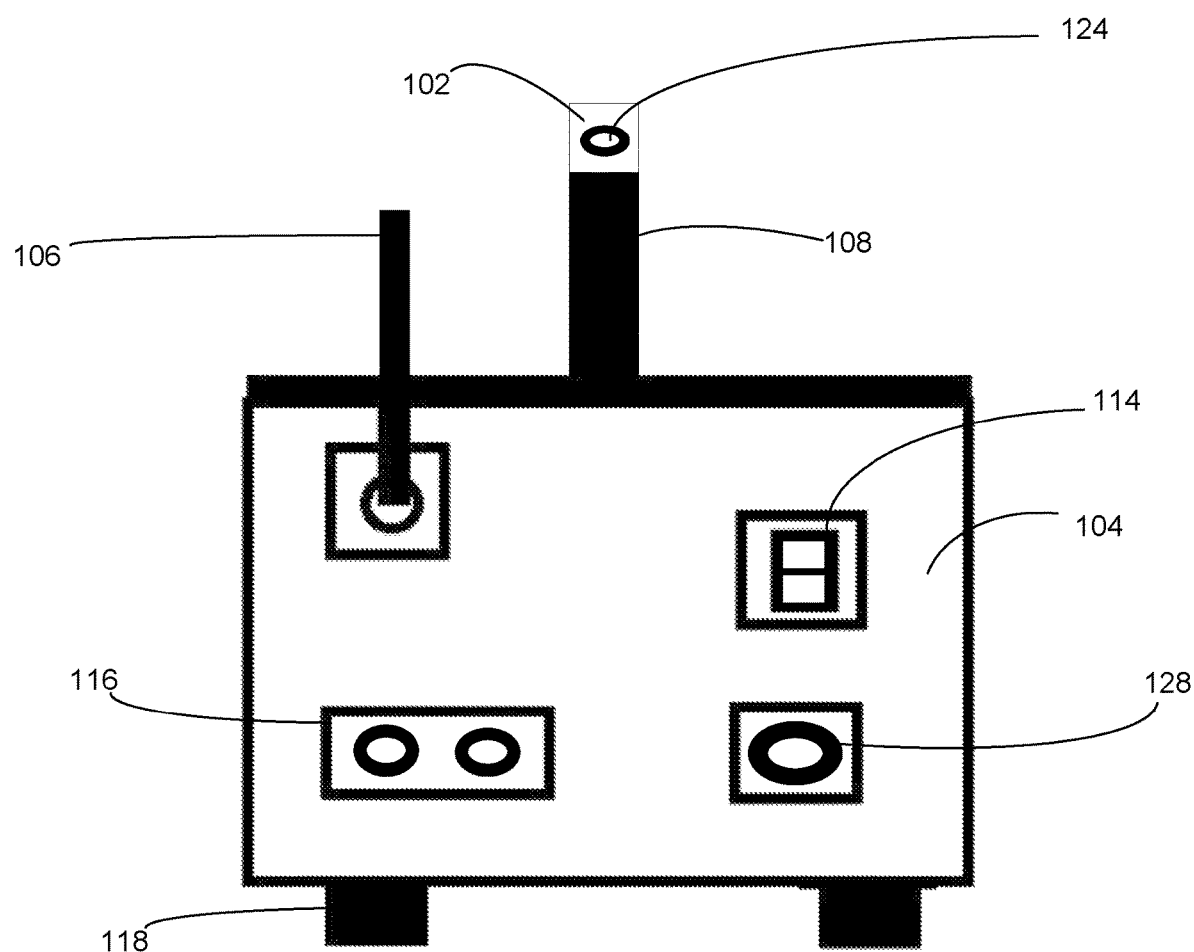
FIG. 2 shows a front view of the exemplary apparatus system shown in FIG. 1.
Figure 3:
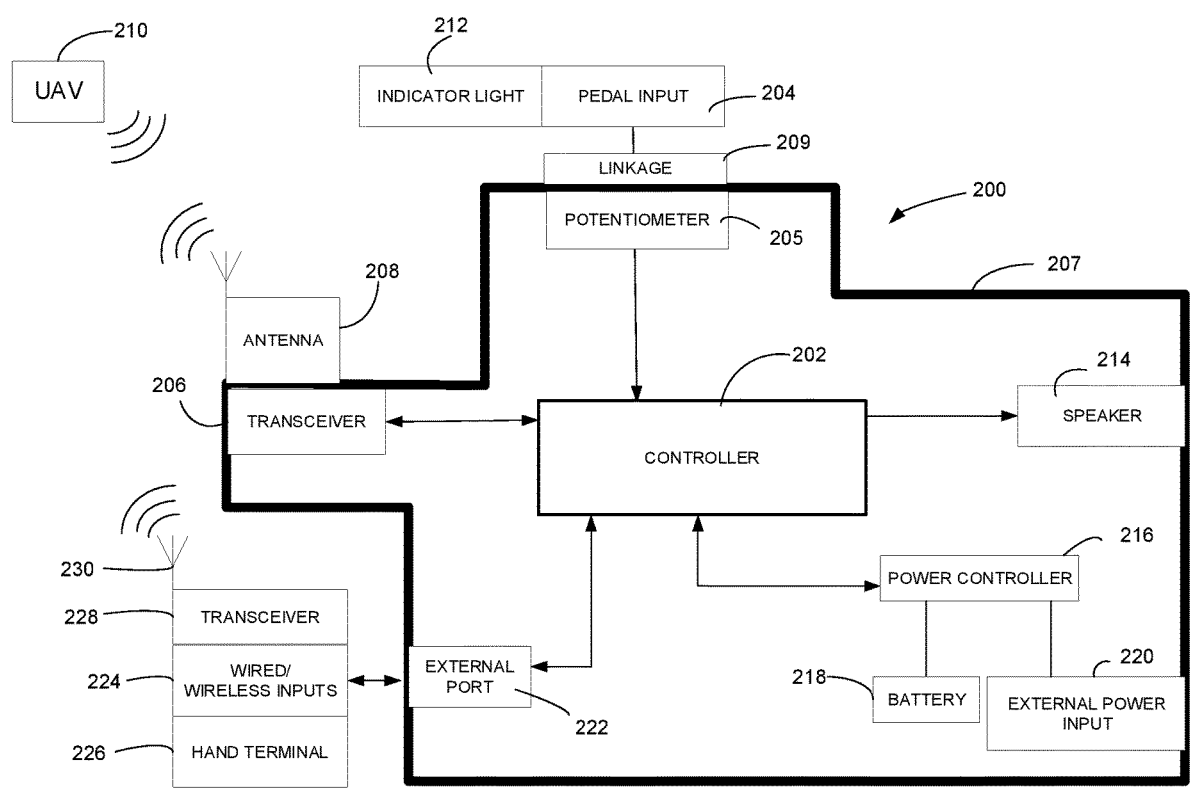
FIG. 3 shows a block diagram of an exemplary control system 200 of the present invention.

With reference now to FIGS. 1-3, the present invention provides a system, method and apparatus for providing foot pedal inputs for controlling a remote piloted vehicle. Referring now to FIG. 1, a side cut-away view of a first exemplary apparatus in accordance with a preferred embodiment shall now be discussed. As shown, an exemplary apparatus 100 in accordance with the present invention may preferably include an enclosure/base 104 which supports an external foot pedal input 102. The foot pedal input 102 may preferably be linked/connected to the base 104 via a compressible linkage 108. Preferably, the compressible linkage 108 may variably control the flow of an indicator signal from/through a first switch and/or a potentiometer 110 to a processor/controller 120 which indicates the angular position of the foot pedal input 102. Preferably, the controller 120 may further translate the foot pedal 102 position into one or more control signals. The controller 120 may preferably then direct the control signals to a transceiver 122, which then preferably transmits the amplified control signals to a UAV through one or more antennas 106.

As further shown in FIG. 1, the exemplary apparatus 100 of the present invention may preferably also include one or more feet 118. Alternately, wheels or other types of base elements may also be used. The apparatus of the present invention 100 may preferably also include a power switch 114, an external power port 116 and a power controller 112. The power controller 112 may preferably control the routing of power in the system and the charging or directing of power to and/or from an internal battery. The system of the present invention may preferably further include an indicator light 124 or the like, as well as a speaker 126 for providing user feedback as discussed further below. As shown in FIG. 2, the system of the present invention may preferably further include a wired control port 128 for linking to an external control device as discussed further below.

With reference now to FIG. 3, a block diagram further illustrating an exemplary control system 200 of the present invention shall now be discussed. As shown, the system 200 may include a central controller 202 which is preferably directly or indirectly linked to various components of the system. As shown, a pedal input 204 is provided and is preferably connected to the base 207 using a linkage system 209. Preferably, the linkage system 209 may be a hinged mechanism that secures the foot pedal 204 to the base and which allows for horizontal/angular movement of the pedal 204. The linkage system 209 preferably includes a restorative element (e.g., spring, or compressible material) which provides a biasing/opposing force to the linkage and pedal assembly, allowing the pedal to return to a neutral position.

In operation, the physical linkage 209 may preferably be connected to one or more potentiometers 205 which vary input resistance based on the physical position of the pedal 204 (e.g., the angular position of the pedal 204). In this way, the angle/position of the pedal 204 may be preferably detected by the controller.

According to a further aspect of the present invention, the foot pedal 204 and linkage assembly 209 may include internal wiring that allows for the transfer/routing of electrical current to an indicator light 212 which may be located near the top of the foot pedal. Alternatively, the indicator light 212 may be constructed to be surface or flush mounted to the foot pedal 204 or base 207, or be part of the foot pedal 204 itself. In operation, the operation of the indicator light 212 may be controlled by the angle/position of the pedal 204 as detected by the potentiometer 205. Alternatively, a separate switch (not shown) may be provided to control current to the indicator light 212. Accordingly, the indicator light 212 may include one or more LEDs or the like which may indicate various states of the system. For example, the indicator light 212 may indicate various states such as: system power ON/OFF, status of data exchange with the UAV or UAV subsystem, and/or a level of detected power or signal.

As with the indicator light 212, groups of other lights and status indicators may be controlled by the controller 202 or other switches to indicate the status of the system 200. For example, the controller 202/system 200 may provide signal inputs to a speaker 214 to provide audio feedback. Such feedback may include sounds indicating signal strength, battery power, UAV power and the like. For example, the controller 202 may include files of audio messages which may be transmitted to the speaker 214 depending on various detected conditions. For example, the controller 202 may trigger an audio message to be played through the speaker 214 (i.e., "fuel running low") when the fuel/battery levels of the system 200 or UAV 210 fall within a given range/threshold. Likewise, a tone or message may be used to indicate that commands issued were successfully received and/or carried out by the UAV or UAV subsystem. Alternatively, the speaker 214 can be connected to other elements to provide other forms of audible information from the UAV such as the speed/distance of the UAV or the signal strength of the UAV transmission. Similar messages may be used for other system states as discussed above with reference to the indicator light 212.

Preferably, the speaker 214 may be internal to the base 207. At the point of mounting, the base material may preferably be reduced or removed to a degree that allows for the audible signature or information to be heard by the UAV operator. According to a further preferred embodiment, the system may also include a volume control and data port that allows for programing of the speaker and functions that it can perform.

The system 200 preferably may further include a power controller 216 for controlling and routing power within the system 200. The power controller 216 may be included within the main controller 202. The power controller 216 may preferably monitor and control power supplied via an internal battery 218 and/or an external power source 220.

The system 200 may preferably also include a transceiver 206 which is directly or indirectly connected to the controller 202. The transceiver 206 is preferably connected to an antenna 208 which may be internal or external to the base 207. According to a preferred embodiment, the transceiver 206 of the present invention may provide bi-directional communication with UAVs or UAV subsystems. Preferably, the transceiver 206 may include one or more transceiver elements for communicating with any of a range of wireless protocols. For example, the transceiver 206 may include any of a mix of modulators, demodulators, and/or receivers for a range of protocols including (but not limited to): Wi-Fi (802.11xxx), 2G-5G, LTE, NFC, RFID, and Bluetooth protocols. Preferably, all communications of the present invention may be designed to be duplex or simplex in nature. Further, as needs require, the processes for transmitting data to and from the present invention may be designed to be push or pull in nature.

According to further preferred embodiments, the system 200 of the present invention may preferably further include internal and/or external ports 222 for hardwired connections such as an RS-232 interface, FAKRA connectors and/or the like to connect to separate modular elements. In this way, the functions of the system 200 may be coordinated with a separate hand terminal 226 or the like. Such separate terminals 226 may be connected via one or more wired/wireless inputs 224, and may include a separate transceiver 228 and antenna 230 arrangement to communicate with and/or to control the UAV 210. Preferably, the functions and operations of the present system 200 may be coordinated and/or divided between the controller 202 and the external terminal 226 when they are connected.

According to a further preferred embodiment, the base unit 207 may be connected and/or linked to one or more other base units (or similar controllers) so that various inputs into the controller(s) 202 may be received from, combined with and/or distributed between different base units. According to exemplary embodiments, multiple foot pedal controllers 200 may be connected via the external port 222 or other inputs. Alternatively, the controller 202 may be programmed to receive control inputs from other base units or the like which the controller 202 may store, forward, or process for an action. For example, the controller 202 may act as a primary controller and may process or act on received inputs from other linked base units, UAVs or other controllers. Additionally, each base unit 207 may act to relay and/or forward signals between other base units or other remote devices.

As should be understood, the examples discussed herein are intended to be illustrative and any of a variety of alternative systems, embodiments and/or configurations may be used with the present invention without limitation. The foregoing description of the preferred embodiment of the present invention has been presented for the purpose of illustration and description. It is not intended to be exhaustive or to limit the invention to the precise form disclosed. Many modifications and variations are possible in light of the above teachings. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

We claim:

1. An apparatus for providing control signals to a remotely piloted unmanned aerial vehicle (UAV), wherein the apparatus comprises:
    a base enclosure;
    a pedal input, wherein the pedal input is mechanically connected to the base enclosure;
    a linkage system, wherein the linkage system comprises a hinged mechanism that secures a foot pedal to the base and which allows for angular movement of at least a first portion of the pedal input;
    a potentiometer, wherein the potentiometer is engaged with the linkage system;
    a central controller, wherein the central controller is configured to receive a first signal from the potentiometer indicating a detected position of the pedal input; wherein the central controller is configured to translate the received first signal into a control signal;
    a transceiver, wherein the transceiver is configured to transmit the control signal to a remotely controlled UAV;
    an antenna, wherein the antenna is configured to direct the control signal from the transceiver to the UAV;
    an indicator light, wherein the indicator light comprises at least a first light which is configured to indicate a first state of the apparatus; wherein the first state is selected from a group of states comprising: system power ON/OFF, status of data exchange with the UAV; and a detected power level in the apparatus; and
    a speaker; wherein the speaker is configured to provide audio feedback regarding operation of the apparatus.

2. The apparatus of claim 1, wherein the foot pedal input is linked to the base by at least one compressible linkage element.

3. The apparatus of claim 2, wherein the linkage system comprises a restorative element.

4. The apparatus of claim 3, wherein the restorative element biases the pedal input into a first starting position.

5. The apparatus of claim 4, wherein the potentiometer is configured to vary input resistance in relation to a detected angular position of the pedal.

6. The apparatus of claim 5, wherein the controller is configured to determine the angular position of the foot pedal input based at least in part on a detection signal produced by the potentiometer.

7. The apparatus of claim 6, wherein the controller is configured to vary one or more electronic signals based at least in part on the angular position of the foot pedal input.

8. The apparatus of claim 7, wherein the system further comprises a power switch, an external power port and a power controller.

9. The apparatus of claim 8, wherein the power controller is configured to control the routing of power in the system.

10. The apparatus of claim 9, wherein the power controller is further configured to charge an internal battery.

11. The apparatus of claim 1, wherein the system further comprises a wired control port; wherein the wired control port is configured to link to an external control device.

12. The apparatus of claim 1, wherein the linkage system comprises a hinged mechanism that secures the foot pedal to the base.

13. The apparatus of claim 12, wherein the linkage system is configured to allow angular movement of the foot pedal.

14. The apparatus of claim 13, wherein the restorative element comprises one or more springs.

15. The apparatus of claim 14, wherein the linkage assembly comprises internal wiring which is configured to transfer electrical current to the indicator light.

16. The apparatus of claim 15, wherein the controller is configured to transmit signal inputs to the speaker to provide audio feedback.

17. The apparatus of claim 16, wherein the audio feedback comprises one or more sounds indicating a system status.

18. The apparatus of claim 17, wherein the system status is selected from the group of system statuses comprising: signal strength, battery power, fuel levels, UAV speed and distance, and UAV power.

19. The apparatus of claim 18, wherein the audio feedback comprises a sound indicating that one or more transmitted commands were successfully received and executed by the UAV.

* * * * *